United States Patent
Binnig et al.

(10) Patent No.: US 7,186,019 B2
(45) Date of Patent: Mar. 6, 2007

(54) THERMAL MOVEMENT SENSOR

(75) Inventors: Gerd K. Binnig, Wollerau (CH); Michel Despont, Adliswil (CH); Mark A. Lantz, Zurich (CH); Peter Vettiger, Langnau (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/526,052

(22) PCT Filed: Aug. 22, 2003

(86) PCT No.: PCT/IB03/03749

§ 371 (c)(1),
(2), (4) Date: Aug. 1, 2005

(87) PCT Pub. No.: WO2004/020328

PCT Pub. Date: Mar. 11, 2004

(65) Prior Publication Data

US 2006/0039442 A1    Feb. 23, 2006

(30) Foreign Application Priority Data

Aug. 29, 2002  (EP) ................................ 02019322

(51) Int. Cl.
*G01N 25/00* (2006.01)

(52) U.S. Cl. ......................................................... 374/6

(58) Field of Classification Search ..................... 374/6
See application file for complete search history.

(56) References Cited

U.S. PATENT DOCUMENTS

| | | | | |
|---|---|---|---|---|
| 4,468,136 A | * | 8/1984 | Murphy et al. | 374/45 |
| 4,747,698 A | * | 5/1988 | Wickramasinghe et al. | 374/6 |
| 5,527,110 A | * | 6/1996 | Abraham et al. | 374/5 |
| 6,004,030 A | * | 12/1999 | Abraham et al. | 374/1 |
| 2004/0129093 A1 | * | 7/2004 | Hauge | 73/865.9 |

OTHER PUBLICATIONS

Abraham et al., "Thermal Proximity Imaging of Hard-Disk Substrates", IEEE Transactions on Mathematic, vol. 36, No. 6, Nov. 2000.*

"Thermal Proximity Imaging of Hard-Disk Substrates", David W. Abraham, et al. IEEE Transactions on Mathematics, vol. 36, No. 6, Nov. 2000, p. 3997-4004.

* cited by examiner

*Primary Examiner*—Robert Raevis
(74) *Attorney, Agent, or Firm*—Louis P. Herzberg (57) ABSTRACT

A transducer for detecting movement of an article mounted for movement in a plane, the transducer comprising: a heater facing the plane of movement of the article and having a temperature dependent resistance; and, an edge defined in the article between regions of different thermal conductivity; wherein, as the article describes the movement, the edge moves relative to the heater producing a corresponding variation in heat loss from the heater and a corresponding variation in resistance of the heater.

12 Claims, 14 Drawing Sheets

THERMAL MOVEMENT SENSOR

CROSS REFERENCE AND PRIORITY

This application filed under 35 USC 371, is cross-referenced with, and claims priority from, International Patent Application PCT/IB2003/03749 filed on Aug. 22, 2003, and published in English with Publication No. WO 2004/020328 on Mar. 11, 2004, under PCT article 21(2), which in turn claims priority of EP 02019322.3, filed on Aug. 29, 2002.

The present invention generally relates to transducers for detecting movement of an article and particularly relates to transducers for detecting movement of an article in a Micro-Electro-Mechanical-System (MEMS) device.

An example of typical MEMS device is a local probe storage device as described in Vettiger et al. "The Millipede"—More than one thousand tips for future AFM data storage, P. Vettiger et al, *IBM Journal of Research and Development*. Vol. 44 No.3, May 2000. Such a device typically comprises a storage surface having a locally deformable film disposed thereon and an array of micro mechanical probe sensors each having a probe tip of atomic dimensions facing the coating. In operation, during a data write operation, the tips are brought into proximity to the storage surface. Energy is selectively applied to each tip, typically in the form of heating. The energy applied to the tips is transferred to the storage surface. The energy transfer produces a local deformation in the storage surface in the vicinity of each energized tip. The array of tips is moved in a scanning motion relative to the storage surface between successive write operations in preparation for writing to new locations on the storage surface. During a read operation, the arrays tips are urged against the storage surface. Simultaneously, the tips are again moved in a scanning motion relative to the storage surface. Local deformations of the storage surface produced during the aforementioned write operation produce deflections in the tips as they are scanned over the surface. Such deflections can be detected thermally or optically. The presence or absence of a local deformation in the storage surface by a tip can be detected as a stored "1" or stored "0". The storage surface is mounted on an X-Y scanner to facilitate the scanning motions associated with the aforementioned reading and writing operations.

In operation, position error signals (PES) encoded in the storage surface facilitate sensing of the position and velocity of the storage surface relative to the tips. However, the PES data may be unavailable in some circumstances, such as upon initial start up of the device or during recovery of the device from a mechanical shock. To acquire the PES data, the scanner is first moved to a specified location and then scanning at a specified velocity is begun. However, to simplify such acquisition, it would be desirable to provide a transducer for movement sensing independently of the PES data in circumstances when the encoded PES signal is not available.

In accordance with the present invention, there is now provided a transducer for detecting movement of an article mounted for movement in a plane, the transducer comprising: a heater facing the plane of movement of the article and having a temperature dependent resistance; and, an edge defined in the article between regions of different thermal conductivity; wherein, as the article describes the movement, the edge moves relative to the heater producing a corresponding variation in heat loss from the heater and a corresponding variation in resistance of the heater.

The article may be mounted for translational movement in the plane. Alternatively, the article may be mounted for rotational movement in the plane. However, initially focussing on the translational case, the edge is preferably located in a plane surface of the article. In particularly preferred embodiments of the present invention, the edge is rectilinear. In a particularly preferred embodiment of the present invention, the heater preferably comprises an elongate body overlapping and extending parallel to the plane surface and perpendicular to the edge. This advantageously provides a surprisingly linear response to displacement of the article. Furthermore, in MEMS embodiments of the present invention to be described shortly, the response is surprisingly fast, thus allowing the use of relatively high bandwidth feedback for a range of servo control applications. The elongate body preferably comprises a silicon cantilever having a doped resistive region formed therein. The transducer technology of the present invention is thus conveniently compatible with other MEMS fabrication technologies. The edge may be located on the periphery of the plane surface. Alternatively, the edge is formed as a step in the plane surface.

The present invention also extends to a movement detection system for detecting movement of an article mounted for movement in a plane, the system comprising: first and second transducers as herein before described operative in opposite directions along a common axis of movement of the article in the plane. Preferably, the first and second transducers respectively face first and second parallel edges of the surface.

The present invention also extends to a movement detection system for detecting movement of an article mounted for movement in a plane, the system comprising: first and second transducers as herein before described operative in orthogonal directions of movement of the article in the plane. Preferably, in this instance, the first and second transducers respectively face first and second orthogonal edges of the surface. This arrangement advantageously facilitates measurement of displacements in two orthogonal directions independently without cross talk between the transducers.

In another embodiment of the present invention, the surface is mounted for rotational movement parallel to the heater about an axis of rotation. The edge may be in the form of a side of a slot formed in the surface and extending radially from the axis of the rotation. Alternatively, the surface may comprise a spoke extending radially from the axis of rotation and the edge comprises a side of the spoke.

Viewing the present invention from another aspect, there is now provided a method for detecting movement of an article mounted for movement in a plane, the method comprising: locating a heater having a temperature dependent resistance to face the plane of movement of the article; defining an edge in the article between regions of different thermal conductivity; and, detecting variation in resistance of the heater corresponding to variation in heat loss from the heater as the edge moves relative to heater during movement of the article in the plane.

Viewing the present invention from yet another aspect, there is now provided a local probe storage device comprising: storage surface, local probe storage array having a plurality of tips facing the storage surface; a scanner for moving the storage surface relative to the array in a plane parallel to the array; and a movement detection system as herein before described for detecting movement of the storage surface relative to the array.

This advantageously facilitates a stiffer scanner subassembly without sacrificing sensitivity. A sensitivity better than the pitch of data tracks on the storage surface, typically around 80 nm, permits start up and seek operations to a specified data track in reduced access times.

Preferred embodiments of the present invention will now described, by way of example only, with reference to the accompanying drawings, in which.

Figure 1:
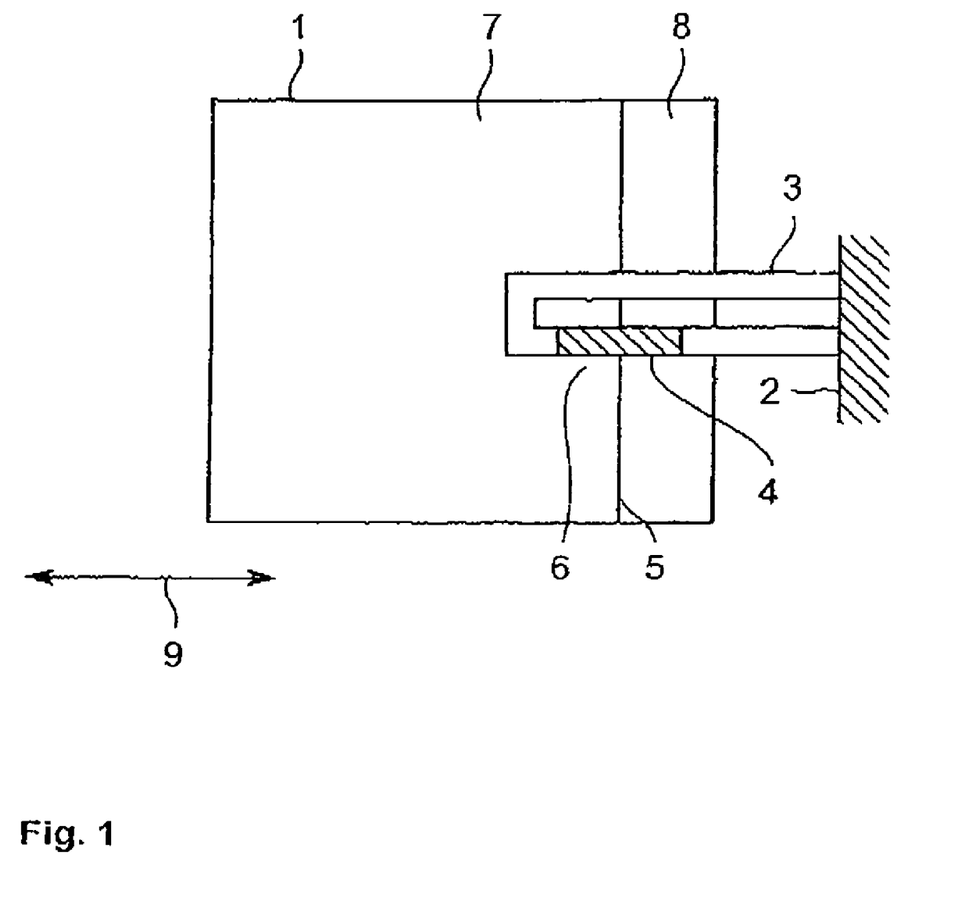
FIG. 1 is a plan view of an example of transducer embodying the present invention.

Referring first to FIG. 1, in a preferred embodiment of the present invention, there is provided a transducer 3 for detecting movement of an article 1 mounted for translational movement in a plane along an axis of travel 9 in either direction relative to reference 2. The transducer 3 comprises a heater 4 facing the plane of movement of the article 1. The heater 4 has a temperature dependent resistance. The article 1 comprises a surface 6 having a first region 7 and a second region 8. The thermal conductivity of the first region 7 is different to that of the second region 8. An edge 5 separates the first region 7 from the second region 8. The edge 5 thus acts as a boundary between regions of greater and lesser thermal conductivity. In operation, as the article 1 is moved along the axis of travel 9, the edge 5 moves relative to the heater 4 producing a corresponding variation in heat loss from the heater 4 and a corresponding variation in resistance of the heater 4.

Figure 2:
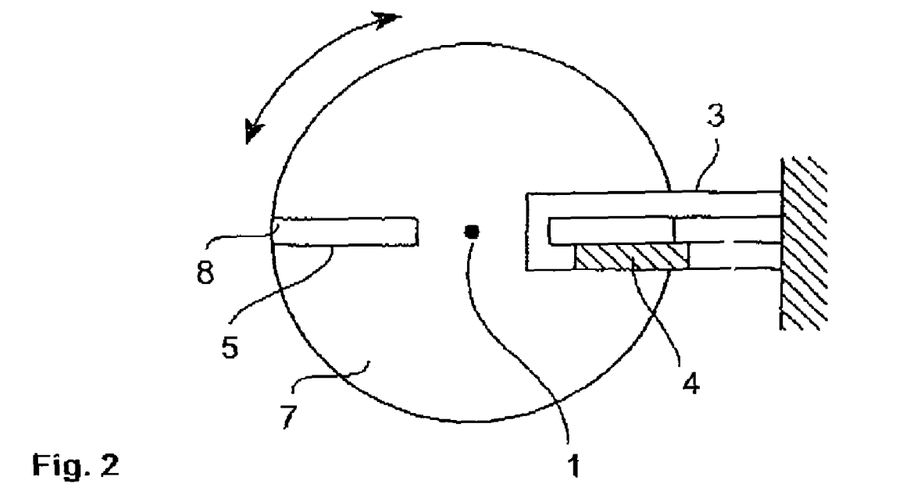
FIG. 2 is a plan view of another example of a transducer embodying the present invention.
Figure 3:
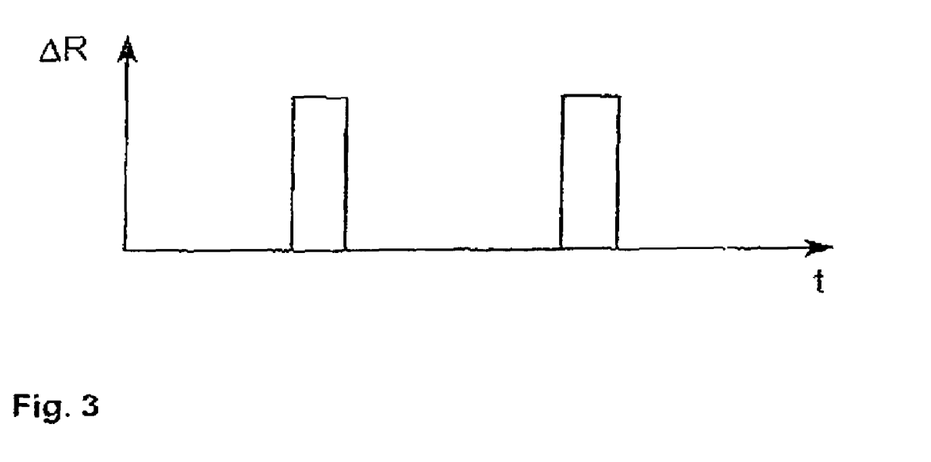
FIG. 3 is a graph of resistance of a heater of the transducer shown in shown in FIG. 2 against time.

Referring now to FIG. 2, in another embodiment of the present invention, there is provided a transducer 3 for detecting movement of an article 1 mounted for rotational movement in a plane about an axis of rotation in either direction. The article 1 is in the form of a rotatable disk, shaft, or spindle. The transducer 3 again comprises a heater 4 facing the plane of rotation of the article 1. Again, the heater 4 has a temperature dependent resistance. The article 1 comprises a surface 6 having a first region 7 and a second region 8. The thermal conductivity of the first region 7 is again different to that of the second region 8. Again, an edge 5 separates the first region 12 from the second region 14. The edge 5 thus acts as a boundary between regions of greater and lesser thermal conductivity. In operation, as the article 1 is rotated, the edge 5 moves relative to the heater 4 producing a corresponding variation in heat loss from the heater 4 and a corresponding variation in resistance of the heater 4. Referring to FIG. 3, as the article 1 rotates, the resistance of the heater 4 follows a pulse wave form, with each pulse corresponding to an instance of the second region 8 passing the heater 4.

The difference in thermal conductivity between the first region 7 and the second region 8 may be implemented in many ways. For example, the second region 8 may be formed from or otherwise coated with a material having different thermal properties from those of the material from which the first region 7 is formed. Alternatively or additionally, one of the first and second regions may be perforated with pores or apertures thereby locally modifying the thermal properties of bulk material. In particularly preferred embodiments of the present invention, the second region 8 is constituted by an air gap. Such an air gap may constituted by introducing a recess into the surface 6, with edge 5 being in the form of a step. Alternatively, in particularly preferred embodiments of the present invention to be described shortly, the air gap may be provided by free space at the periphery of the surface 6, with the edge 5 being a peripheral edge of the surface 6.

Figure 4:
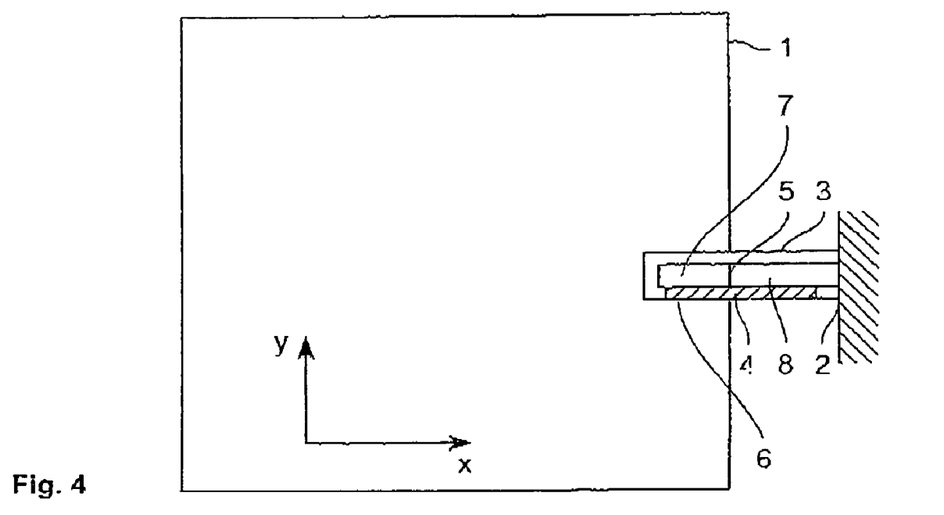
FIG. 4 is a plan view of yet another example of a transducer embodying the present invention.

Differences in thermal conductivity become significant on the micro meter or nano meter scale of especially preferred embodiments of the present invention. Turning to FIG. 4 for example, in a preferred embodiment of the present invention, there is provided a transducer 3 as herein before described with reference to FIG. 1 for measuring the nanometer scale linear movement of an article 1. The transducer 3 is formed from silicon. However, it will be appreciated that in other embodiments of the present invention, different materials may be employed in place of silicon. The transducer 3 is positioned in proximity to but spaced from an peripheral edge 5 of a surface 6 of the article 1, such that the first region 7 is formed from the bulk material of the surface 6 and the second region 8 is formed from air or gas surrounding the article 1. The transducer 3 comprises an elongate body extending from the reference 2 in a direction perpendicular to the edge 5 of the surface 6 and parallel to the surface 6. The body of the transducer 3 carries an electrically conductive path for carrying an electrical current. The conductive path may be formed by doping the silicon body of the transducer 3 with suitable charge donors or acceptors. Other techniques for introducing the conductive path will be apparent to those skilled in the art. The body of the transducer 3 comprises a pair of limbs terminating in an interconnection remote from the reference. It will be appreciated however that other designs for the body of the transducer 3 are equally possible. A thermally isolated electrically resistive heater element 4 is disposed on the body in the electrically conductive path. The heater 4 may be again formed by doping the silicon body with suitable donors or acceptors. Other techniques for introducing the heater 4 will be apparent to those skilled in the art. The heater 4 is positioned on the body of the sensor 3 such that the edge 5 of the surface 6 is located along the length of the heater 4. The heater 4 is at least as long as the desired displacement range of the article 1 and aligned with its longitudinal axis parallel to the direction of motion to be sensed.

In operation, a current is passed through the heater 4. The current flow causes heat generation in the heater 4. The resistance of the heater 4 is dependent on the temperature of the heater 4. The temperature of the heater 4 is dependent on the distance between the heater 4 and the surface 6. Accordingly, the temperature of the heater 4 is dependent of the position of the heater 4 relative to the surface 6. More specifically, the temperature of the heater 4 is dependent on the level of overlap between the heater 4 and the surface 6. The relationship between the temperature of the heater 4 and the surface 6 stems from conduction of heat energy from the heater 4 to the surface 6 through the intervening gap.

The efficiency of such conduction is dependent on the distance between the heater 4 and the surface 6. When the surface 6 is displaced in a direction parallel to the longitudinal axis of the sensor 3, the average distance from the heater 4 to the surface 6 is increased or decreased by virtue of the edge 5 formed on the surface 6. An increase or decrease in this distance produces a corresponding change in cooling efficiency of the heater 4. The change in cooling efficiency produces a corresponding change in resistance of the heater 4. In especially preferred embodiments of the present invention, the edge 5 of the surface 6 adjacent the heater 4 is both smooth and perpendicular to the direction of motion to be sensed such that any motion in this perpendicular direction produces no change in cooling efficiency and therefore no signal. Similarly, in particularly preferred embodiments of the present invention, the plane of the heater 4 is parallel to the plane of the surface 6 to provide an output signal which varies as a linear function of displacement of the article 1. The sensitivity of the transducer 3 is dependent on the spacing between the heater 4 and the surface 6.

Figure 5:
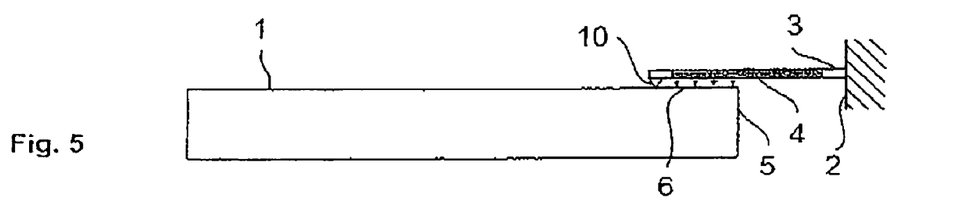
FIG. 5 is a side view of the transducer shown in FIG. 4.
Figure 6:
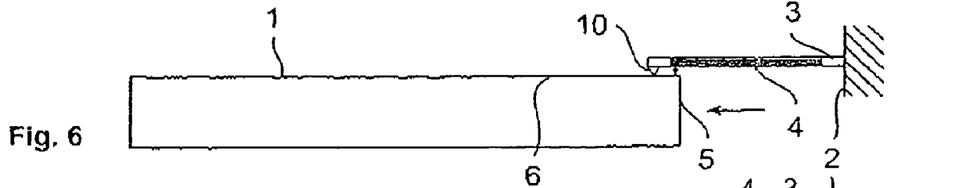
FIG. 6 is another side view of the transducer shown in FIG. 4.
Figure 7:
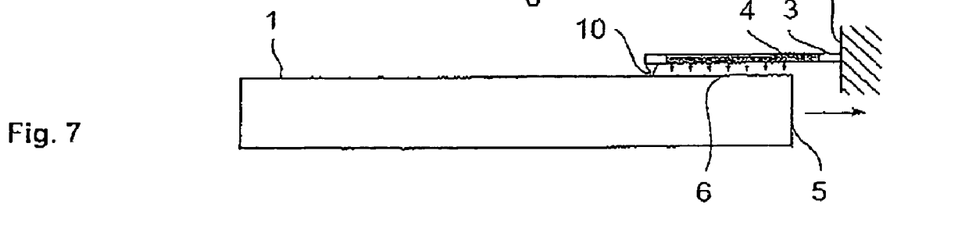
FIG. 7 is yet another side view of the transducer shown in FIG. 4.

Referring to FIGS. 5, 6 and 7, it will be appreciated that the areas of the surface 6 and the heater 4 overlapping or in other words facing each other vary as the article 1 is moved relative to the reference 2. For example, in FIG. 5, approximately half of the heater is facing the surface 6, corresponding to the transducer 3 being close to the middle of its range. In FIG. 6, the transducer 3 is at one extremity of its range, with a minimal area of the heater 4 facing the surface 6. Motion of the surface 6 towards this extremity results in a decrease in cooling of the heater 4. The temperature of the heater 4 is therefore increased. The increase in temperature is measured as a change in resistance of the heater 4. Conversely, in FIG. 7, the transducer 3 is at the other extremity of the its range, with near to the full area of the heater 4 facing the surface 6. Motion of the surface 6 towards this extremity results in an increase in cooling of the heater 4. The temperature of the heater 4 is therefore decreased. The decrease in temperature is again measured as a change in resistance of the heater 4.

Figure 8:
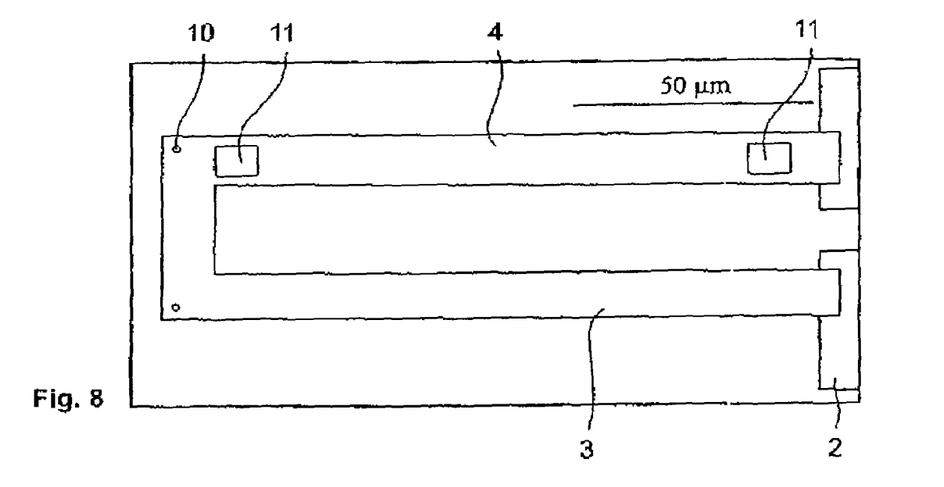
FIG. 8 is a scanning electron microscope (SEM) micrograph of a preferred example of transducer embodying the present invention in plan view.

Remaining with FIGS. 5, 6, and 7, in particularly preferred embodiments of the present invention, this spacing is defined by at least one tip 10 disposed at the end of the transducer 3 overlying the surface 6. The or each tip 10 is in sliding contact with the surface 6. In operation, the or each tip 10 facilitates well defined spacing of the transducer 3 relative to the surface 6 while maintaining thermal isolation of the heater 4 relative to the surface 6. With reference to FIGS. 7 and 8 in combination, in a particularly preferred embodiment of the present invention, the transducer 3 herein before described is fabricated from a silicon substrate in the form of a cantilever spring extending by around 150 micro meters from the reference 2. The cantilever spring comprises a pair of limbs interconnected in a termination remote from the reference 2. The conduction path passes along one limb, through the termination, and then along the other limb. The heater 4 is located in one of the limbs. An aperture 11 is formed in the limb carrying the heater 4 at each end of the heater 4. The apertures 11 introduce constrictions in the thermal conduction path between the heater 4 and the rest of the transducer 3, thereby thermally isolating the heater 4. Dopant implantation of the host limb is employed in this instance to produce the heater 4. However, in other embodiments of the present invention, the heater 4 may be produced by other techniques.

In especially preferred embodiments of the present invention, the transducer 3 is made resistant to torsional forces in the interests of minimizing twisting of the transducer 3 by friction between the or each tip 10 and the surface 6. Such twisting may otherwise adversely affect the linearity of the transducer 3. The twin limb design of the transducer 3 described with reference to FIGS. 8 and 9 assists in offering torsional resistance. Note that in the preferred embodiments shown in FIGS. 8 and 9, a pair of the aforementioned tips 10 are positioned near to opposite corners of the termination of the transducer 3. By positioning a pair of such tips 10 in this manner, additional stability and reduced sensitivity to torsional motion in the transducer 3 is obtained.

Figure 9:
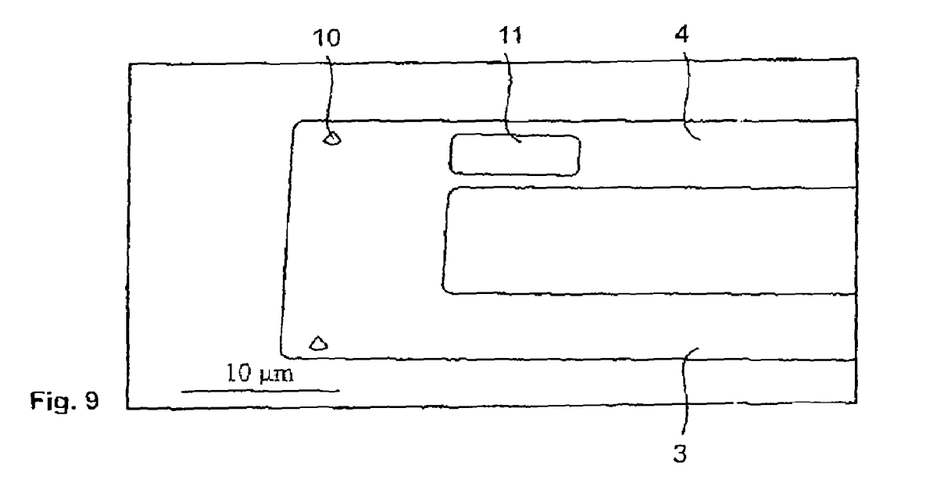
FIG. 9 is a magnification of the SEM micrograph shown in FIG. 8.
Figure 10:
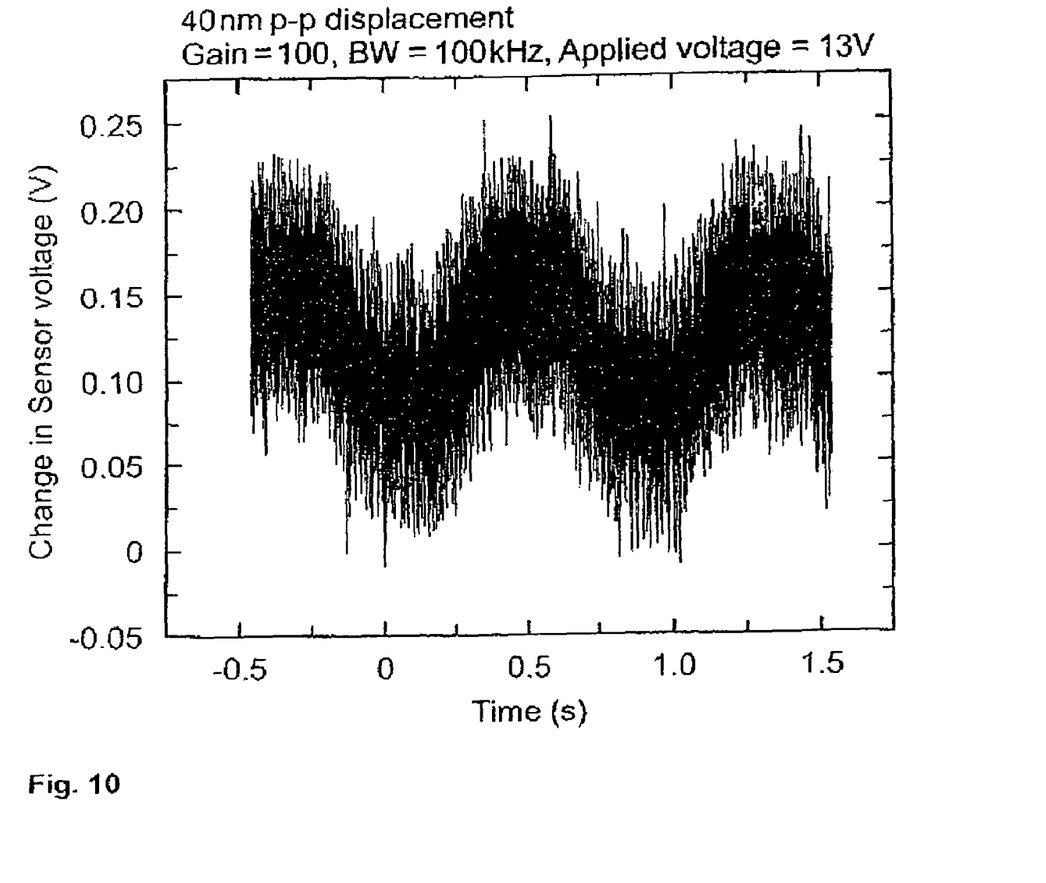
FIG. 10 is a graph of change in sensor voltage versus time for an example of a transducer embodying the present invention.
Figure 11:
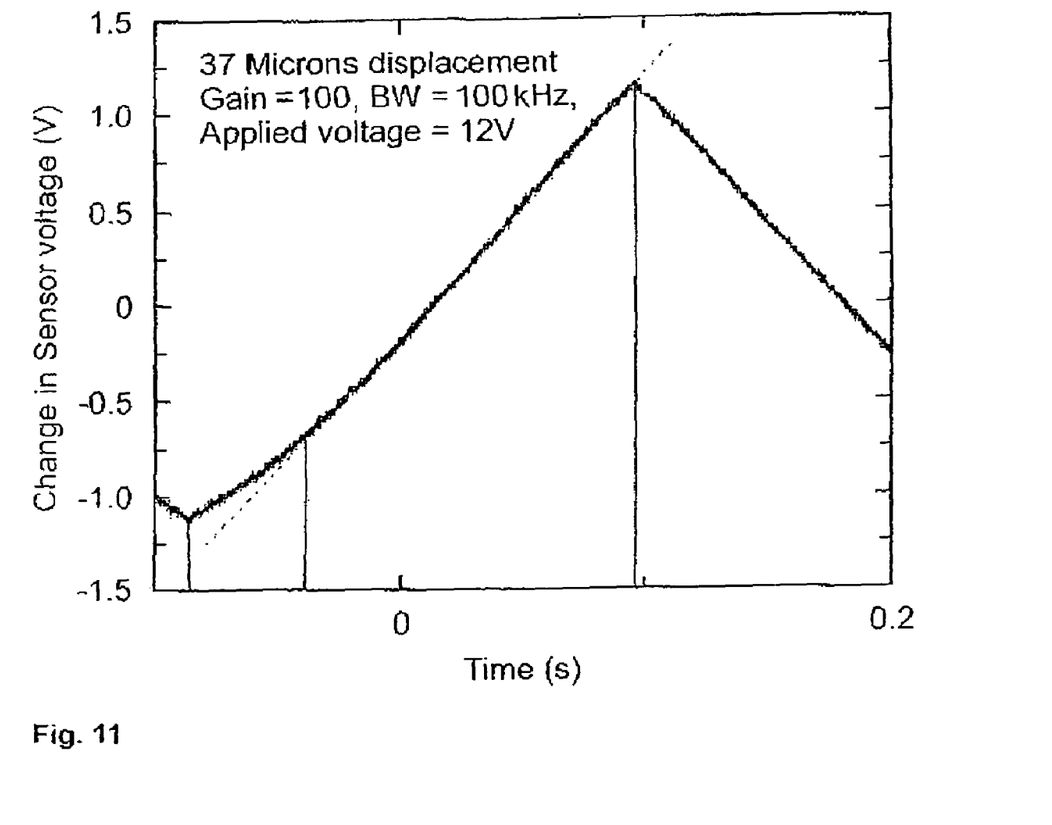
FIG. 11 is another graph of change in sensor voltage versus time for an example of a transducer embodying the present invention.

FIGS. 10 and 11 illustrate measurements of sensitivity and linearity of the transducer 3 herein before described with reference to FIGS. 8 and 9. The measurements were performed with the tips 10 of the transducer 3 in contact with a sample surface of silicon in an arrangement similar to that herein before described with reference to FIGS. 4 to 7. The measurements were obtained by applying a direct current (DC) voltage across the transducer 3 in series with a 10 kOhm resistor and monitoring voltages changes across the transducer 3 as the sample table was displaced in a periodic linear motion following a triangular wave form. The voltage changes were observed via a DC coupled amplifier with a gain of 100 and a bandwidth of 100 kHz. The graph of FIG. 7 shows the detected signal resulting from a 40 nm displacement of the surface 6. Apparent from FIG. 10 is a sensitivity in the transducer 3 of less then 40 nm in a 100 kHz bandwidth with a signal to noise ratio of approximately 1. The graph of FIG. 11 shows the response of the transducer 3 to a 37 micro meter periodic linear displacement of a triangular wave form). Specifically, the graph of FIG. 11 demonstrates that the transducer 3 has a linear response over a range of more then 25 micro meters. In the region in which the response of the transducer 3 to displacement is substantially linear, the velocity and acceleration of the surface 6 can be calculated by taking the first and second derivatives of the voltage signal. The deviation from linearity observed below −0.5V on the y axis results from an angular misalignment between the transducer 3 relative to the plane of the surface 6. The thermal time constant of this particular example of the present invention with the tips 10 in contact with the surface 6 was measured to be in the region 50 microseconds. Other embodiments of the present invention may exhibit different thermal time constants.

Figure 12:
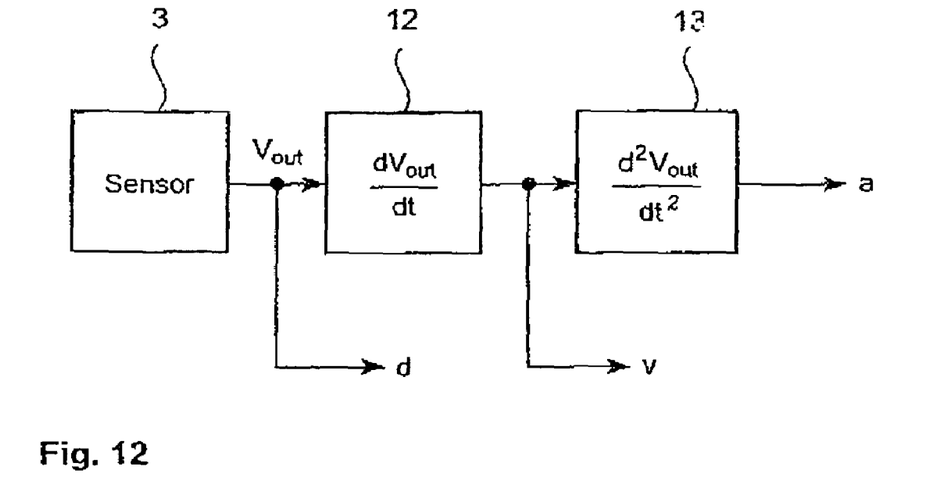
FIG. 12 is a block diagram of circuitry for obtaining displacement, velocity, and acceleration measurements from a transducer embodying the present invention.
Figure 13:
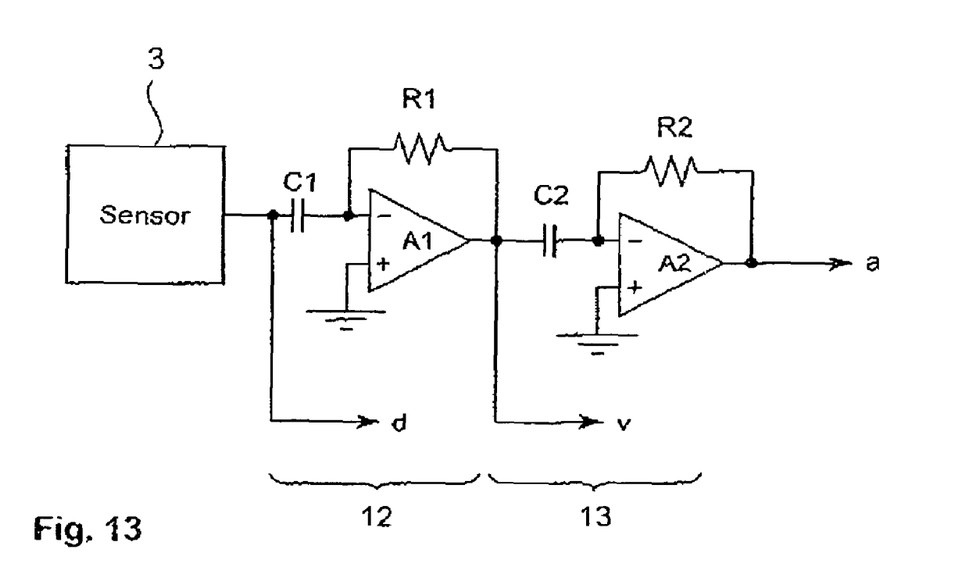
FIG. 13 is a simplified circuit diagram of circuitry for obtaining displacement, velocity, and acceleration measurements from a transducer embodying the present invention.

As indicated earlier, the velocity and acceleration of the surface 6 can be calculated by taking the first and second derivatives of the voltage signal from the transducer 3. Referring now FIG. 12, in a preferred embodiment of the present invention, the first and second derivatives of the voltage signal from the transducer 3 are obtained by connecting first and second differentiator circuits 12 and 13 in series to the output of the transducer 3. In operation, the output of the transducer 3 produces a signal indicative of the sensed displacement d, the output of the first differentiator circuit 12 produces a signal indicative of the sensed velocity v, and the output of the second differentiator circuit 13 produces a signal indicative of the sensed acceleration a. Referring to FIG. 13, the first differentiator circuit 12 may be formed from a capacitor C1, resistor R1, and virtual earth amplifier A1 having a negative feedback loop including R1. Similarly, the second differentiator 13 may be formed from a capacitor C2, resistor R2, and virtual earth amplifier A2 having a negative feedback loop including R2. It will be appreciated that other differentiator circuit designs are also possible.

Figure 14:
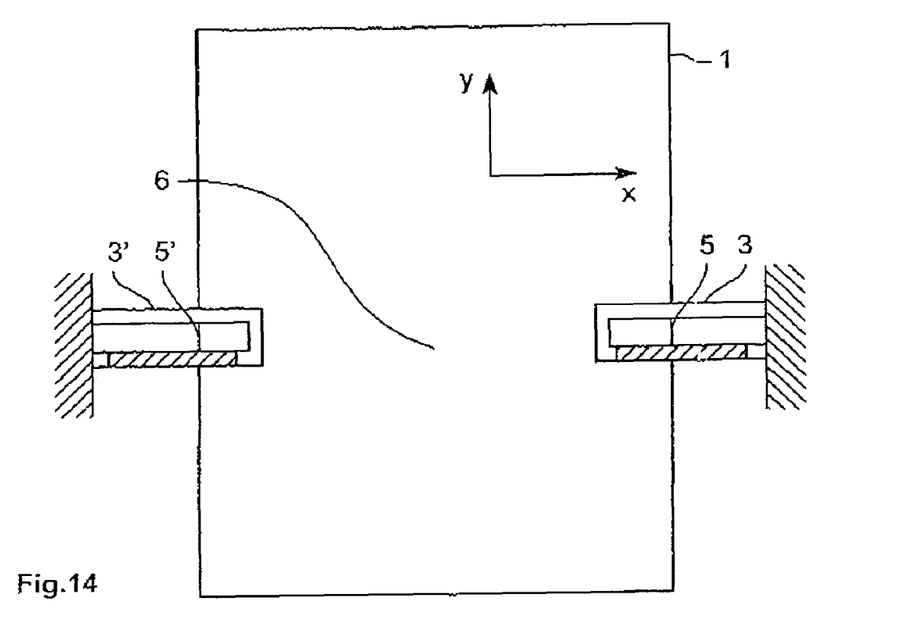
FIG. 14 is a plan view of an example of another transducer embodying the present invention.
Figure 15:
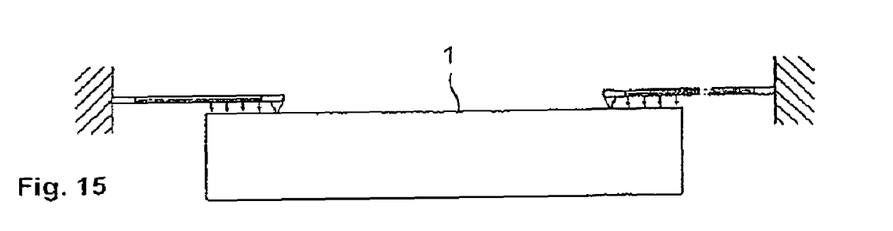
FIG. 15 is a side view of the transducer shown in FIG. 14.
Figure 16:
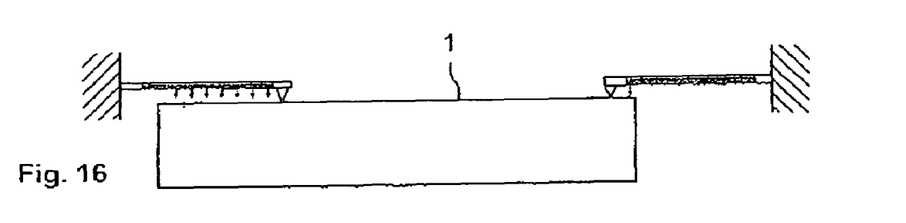
FIG. 16 is another side view of the transducer shown in FIG. 14.

In some environments, changes in ambient temperature and the like may give rise to undesirable DC drift in measurements obtained from a transducer 3 of the form herein before described. Such changes unsuitable for some applications. However, referring now to FIG. 14, in an especially preferred embodiment of the present invention, sensitivity to DC drift is minimized by employing a pair of transducers 3 and 3' as herein before described. Specifically, the transducers 3 and 3' are placed adjacent opposite edges 5 and 5' of the surface 6. The difference in output voltages from the transducers 3 and 3' is then measured. In FIG. 15, the surface 6 is positioned close to the midpoint of the range of the transducers 3 and 3'. Accordingly, the surface 6 is facing approximately equal areas of the transducers 3 and 3'. However, in FIG. 16 the surface 6 is displaced along the axis of detection of the transducers 3 and 3' to one extremity of the range of the transducers 3 and 3'. Accordingly, almost all of one transducer 3' is facing the surface 6 while almost none of the other transducer 3 is facing the surface 6.

Figure 17:
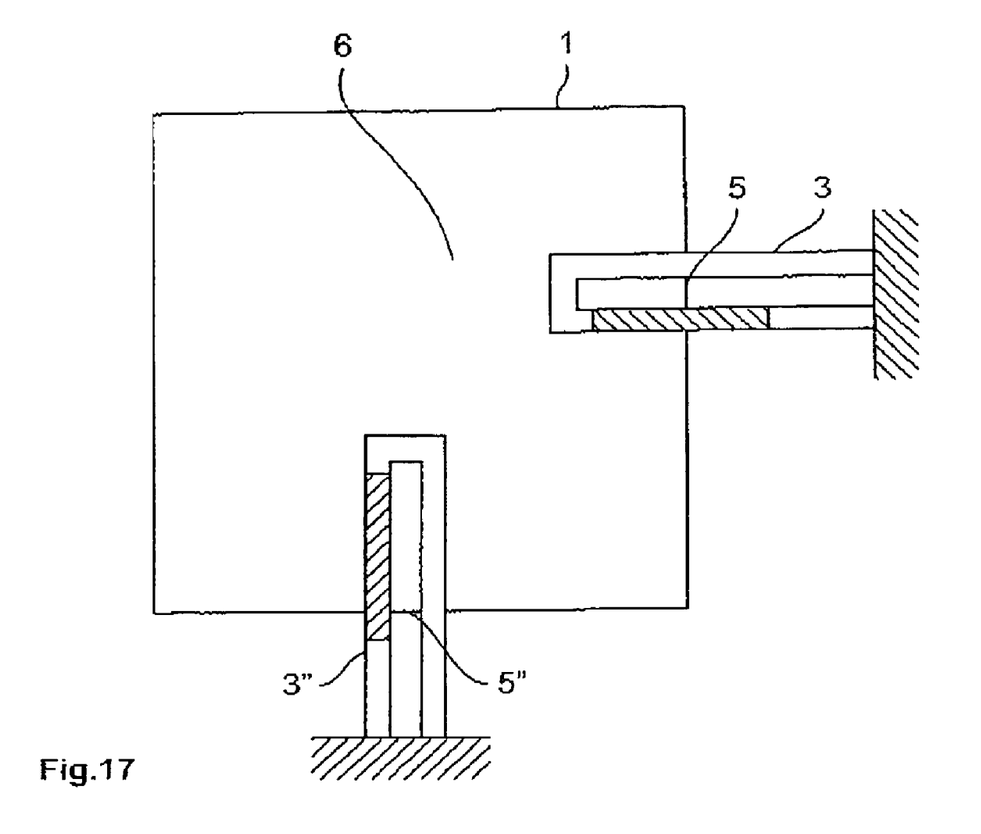
FIG. 17 is a plan view of another transducer embodying the present invention.

In the preferred embodiments of the present invention herein before described a transducer 3 is provided for measuring displacement of an article along a single axis of motion. However, the present invention is equally applicable to measuring linear movement of an article 1 along more than one axis of motion. For example, referring now to FIG. 17, in another preferred embodiment of the present invention, there is provided two transducers 3 and 3" as herein before described with reference to FIGS. 1 to 10 each measuring displacement of an article 1 in a corresponding one of two orthogonal directions. Specifically, one of the transducers 3 is positioned adjacent a first edge 5 of the surface 6. The other transducer 3" is positioned adjacent a second edge 5" of the surface 6 orthogonal to the first edge 5. Each of the transducers 3 and 3" thus provides a movement measurement corresponding to linear movement of the surface 6 along a different one of two orthogonal axis of movement of the surface 6. The independent operation of the two transducers 3 and 3" prevents cross talk between the two measurements.

Figure 18:
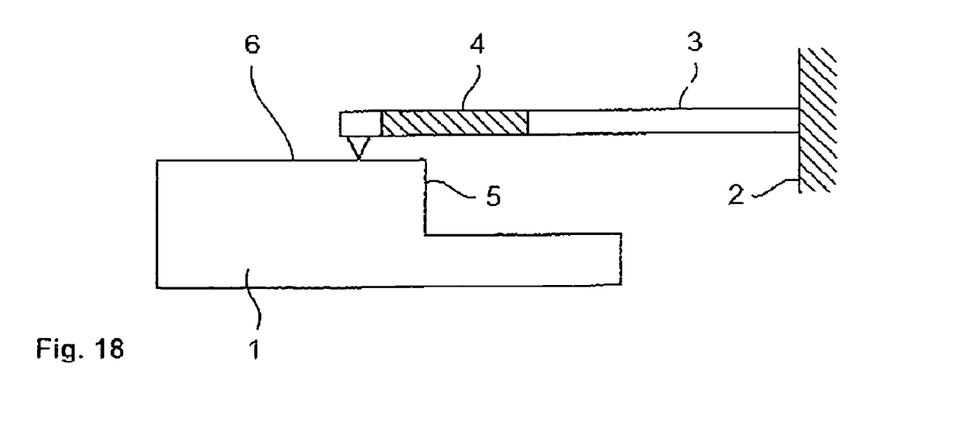
FIG. 18 is yet another side view of a transducer embodying the present invention.

In some of the preferred embodiments of the present invention herein before described, the edge 5 of the surface 6 is provided by the periphery of the surface. However, referring to FIG. 18, in other embodiments of the present invention, the edge 5 may, as indicated earlier, be provided by a step formed in the surface 6. Other formations of the edge 5 are also possible, such as slots in the surface 6 and the like.

Figure 19:
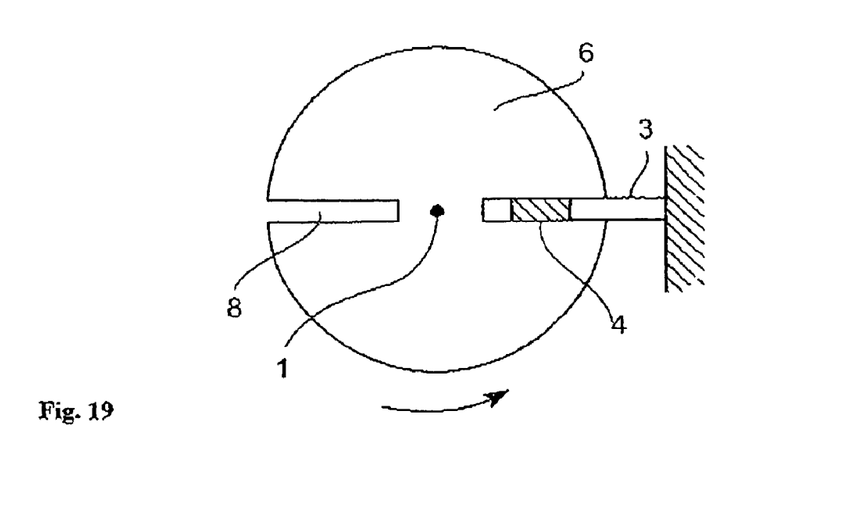
FIG. 19 is a plan view of yet another transducer embodying the present invention.
Figure 20:
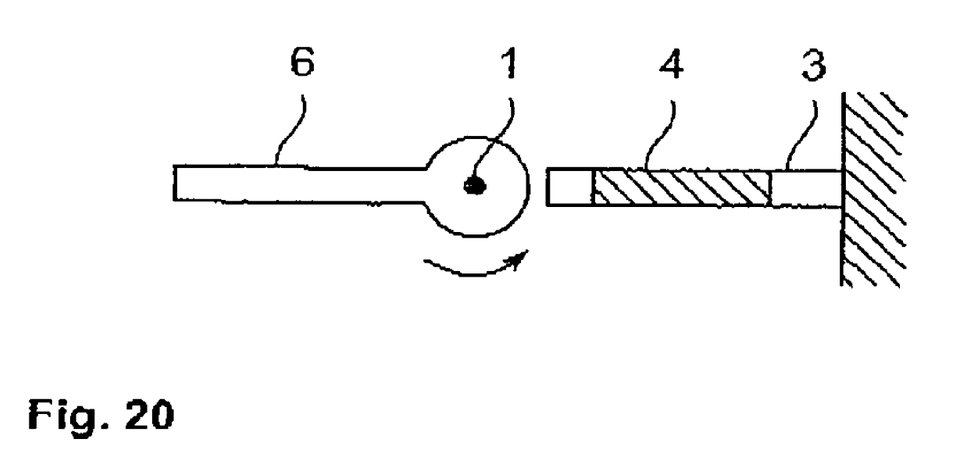
FIG. 20 is a plan view of a further transducer embodying the present invention.

As indicated earlier, with reference to FIG. 2, the present invention is equally applicable to detection of rotational movement. Referring to FIG. 19, in a modification of the embodiment of the present invention shown in FIG. 2, the second region 8 is constituted by a radial slot 9 formed in the disk 6. A transducer 3 as herein before described with reference to FIGS. 1 to 10 is disposed adjacent the disk 6 in a plane parallel to the disk 6 such that the slot 9 passes the heater 4 as the disk 6 rotates. Thermal conduction between the heater 4 and the disk 6 is disturbed each time the slot 9 passes the heater 4. As indicated earlier, these disturbances can be detected electrically from the heater 4. A pulse signal indicative of the rate of rotation of the shaft 1 can thus be generated. It will be appreciated then that this embodiment of the present of the invention is particularly although not exclusively useful in tachometer applications. In another modification of the preferred embodiment shown in FIG. 18 a plurality of equidistantly spaced radial slots 9 are formed in the disk 6. The slots 9 facilitate measurement of rotary displacement of the shaft 1. It will be appreciated that, in other embodiments of the present invention, the slots 9 may be replaced by recesses formed in the disk 6. Referring to FIG. 20, in another modification of the present invention herein before described with reference to FIG. 19, the surface 6 is in the form of a spoke extending radially from the shaft 1. Thermal conduction from the heater 4 is disturbed each time the spoke 6 passes the heater 4. Again then, a pulse signal indicative of the rate of rotation of the shaft 1 can be generated electrically from the heater 4. It will be appreciated that a plurality of radial spokes 6 may be connected to the shaft 1 to facilitate measurement of rotary displacement of the shaft 1.

Figure 21:
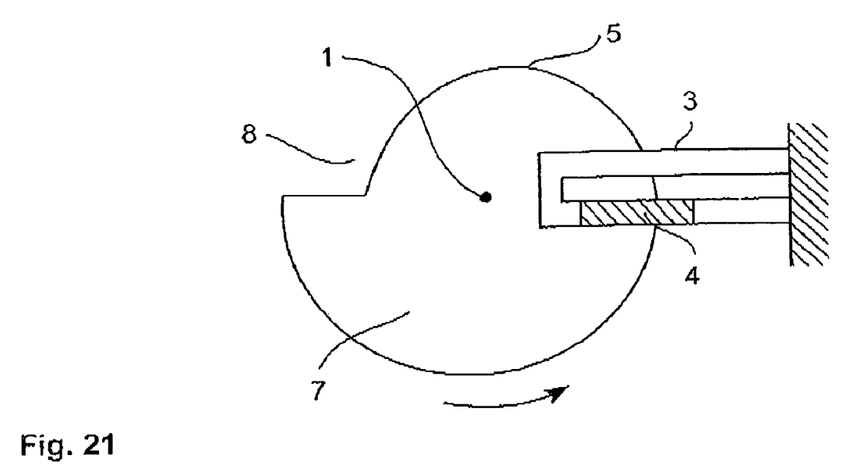
FIG. 21 is a plan view of yet another example of a transducer embodying the present invention.
Figure 22:
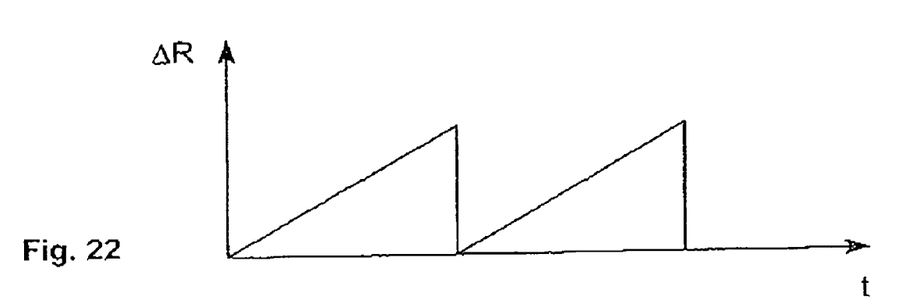
FIG. 22 is a graph of resistance of a heater of the transducer shown in shown in FIG. 21 against time.

Referring now to FIG. 21, in another embodiment of the present invention for detecting rotation of a shaft 1, the first region 7 is provided by a comma-shaped surface attached to the shaft 1 and the second region 8 is provided by the air surrounding the surface. The edge 5 between the first region 7 and the second region 8 is provided by the periphery of the surface. The surface is shaped such that the radial distance between the axis of rotation of the periphery of surface increases from a minimum to a maximum along the periphery of the surface. The transducer 3 is disposed adjacent the surface as herein before described with reference to 19. Referring to FIG. 22, as the shaft rotates, the resistance of the heater 4 follows a swath wave form.

Figure 23:
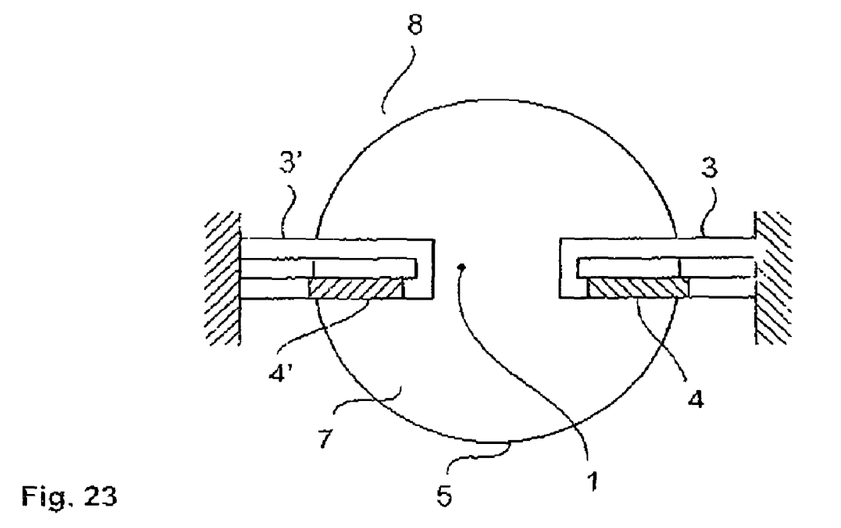
FIG. 23 is a plan view of a further example of a transducer embodying the present invention.
Figure 24:
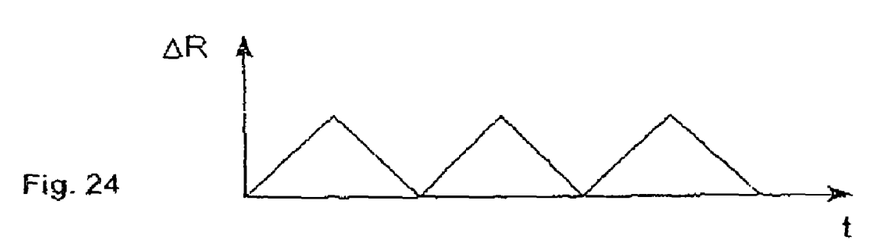
FIG. 24 is another graph of resistance of a heater of the transducer shown in shown in FIG. 23 against time.

Referring to FIG. 23, in yet another embodiment of the present invention for detecting rotation of the shaft, the first region is provide by a disk-shaped surface attached to the shaft 1 and the second region 8 is provided by the air surrounding the surface. The edge between the first region 7 and the second region 8 is provided by the periphery of the disc. A pair of transducers 3 and 3' as herein before described face opposite edges of the disc. The axis of rotation of the shaft 1 is offset relative to the center of the disc. Referring to FIG. 24, as the shaft rotates, the resistance of the heater 4 on one of the transducers 3 follows a triangular wave form.

Figure 25:
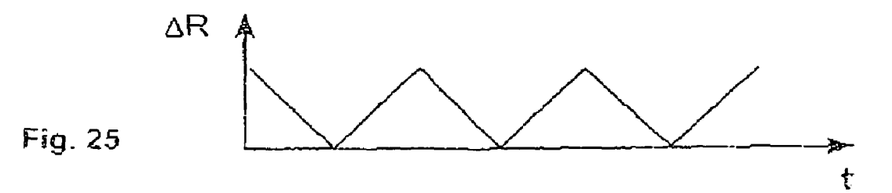
FIG. 25 is yet another graph of resistance of a heater of the transducer shown in shown in FIG. 23 against time.
Figure 26:
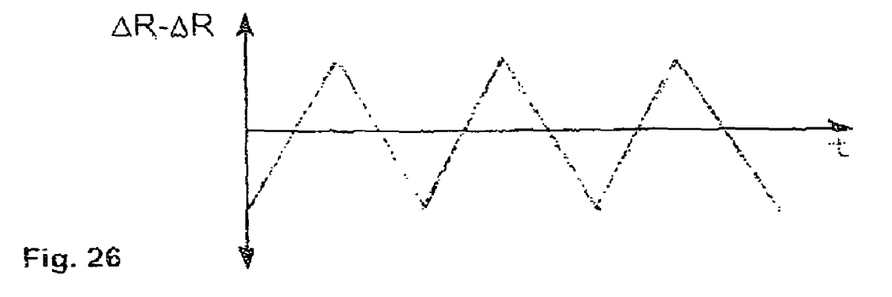
FIG. 26 is a further graph of resistance of a heater of the transducer shown in shown in FIG. 23 against time; and, FIG. 27 is a side view of a local probe storage device embodying the present invention.

Similarly, referring to FIG. 25, as the shaft rotates, the resistance of the heater 4' on the other transducer 3' follows a triangular wave form. However, the triangular wave form associated with the resistance of heater 4' is 90 degrees out of phase from the triangular wave form associated with the resistance of heater 4. Referring to FIG. 26, a composite output from the transducers 3 and 3', in which any DC offset in the detected signals is removed, can be created by subtracting the output from one of the heaters 4 and 4' from the other.

Figure 27:
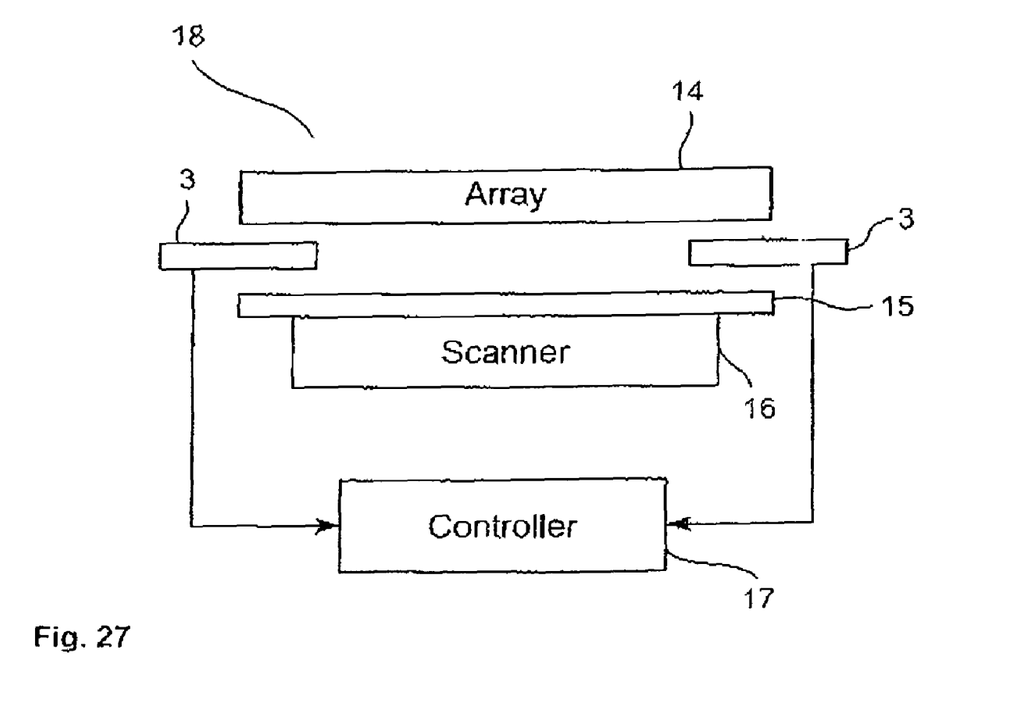

With reference to FIG. 27, transducers 3 and 3' embodying the present invention herein before described with reference to FIGS. 8 and 9 are particularly useful for measuring the movement of an article 1 relative to a reference 2 such as a storage surface 15 relative to the local probe array 14 in a local probe storage device 18 as described in the aforementioned Vettiger et al. document. As indicated earlier, in a local probe storage device 18, the storage surface 15 is typically moved in orthogonal directions within a plane parallel to the array 14 via a micro mechanical scanner subsystem 16. The scanner subsystem 16 may implemented by piezoelectric devices. However, other scanning mechanisms are possible. A controller 17 is connected to the scanner 16 and the transducers 3. Two cooperating pairs of transducers 3 each as herein before described with reference to FIG. 13 are provided. One of the pairs of transducers 3 detects movement in one of the orthogonal directions of travel. The other pair of transducers 3 detects movement in the other direction of travel. The outputs from the transducers 3 are fed to the controller 17 to complete a negative feedback control loop for controlling movement of the array 14 relative to the storage surface 15, particularly in circumstances where the aforementioned PES signal has yet to be acquired or reacquired. The controller may be implemented in hard wired circuitry, computer program code, or by a combination of hard wired circuitry and computer program code. It will be appreciated that the present invention is equally useful in many other applications. Examples of such applications include displacement sensors, velocity sensors, and accelerometers for automotive control systems and actuators and industrial plant control systems. Many other applications will be apparent.

The invention claimed is:

1. A transducer for detecting movement of an article mounted for movement in a plane, the transducer comprising:
   the article;
   a heater facing the plane of movement of the article and having a temperature dependent resistance; and
   an edge defined in the article between regions of different thermal conductivity; wherein, as the article undergoes the movement, the edge moves relative to the heater producing a corresponding variation in heat loss from the heater and a corresponding variation in resistance of the heater, and wherein:
      the article is mounted for translational movement in the plane;
      the edge is located in a plane surface of the article;
      the edge is rectilinear and
      the heater comprises an elongated body overlapping and extending parallel to the plane surface and perpendicular to the edge; and
      the elongated body comprises a silicon cantilever having a doped resistive region formed therein.

2. A transducer as claimed claim 1, wherein the edge is located on the periphery of the plane surface.

3. A transducer as claimed in claim 1, wherein the edge is formed as a step in the plane surface.

4. A movement detection system for detecting movement of an article mounted for movement in a plane, the system comprising: first and second transducers as claimed in claim 1 operative in opposite directions along a common axis of movement of the article in the plane.

5. A movement detection system as claimed in claim 4, wherein the first and second transducers respectively face first and second parallel edges of the surface.

6. A local probe storage device comprising: storage surface, local probe storage array having a plurality of tips facing the storage surface; a scanner for moving the storage surface relative to the array in a plans parallel to the array; and a movement detection system as claimed in claim 4 for detecting movement of the storage surface relative to the array.

7. A movement detection system for detecting movement of an article mounted for movement in a plane, the system comprising: first and second transducers as claimed in claim 1 operative in orthogonal directions of movement of the article in the plane.

8. A movement detection system as claimed in claim 7, wherein the first and second transducers respectively face first and second orthogonal edges of the surface.

9. A transducer as claimed in claim 1, wherein the surface is mounted for rotational movement parallel to the heater about an axis of rotation.

10. A transducer as claimed in claim 9, wherein the edge is in the form of a side of a slot formed in the surface and extending radially from the axis of the rotation.

11. A transducer as claimed in claim 9, wherein the surface comprises a spoke extending radially from the axis of rotation and the edge comprises a side of the spoke.

12. A method, for detecting movement of an article mounted for movement in a plane, the method comprising: locating a heater having a temperature dependent resistance to face the plane of movement of the article; defining an edge in the article between regions of different thermal conductivity; and, detecting variation in resistance of the heater corresponding to variation in heat loss from the heater as the edge moves relative to heater during movement of the article in the plane, wherein the edge is located in a plane surface of the article, wherein the edge is rectilinear, and wherein the heater comprises an elongated body overlapping and extending parallel to the plane surface and perpendicular to the edge, and
   wherein the elongated body comprises a silicon cantilever having a doped resistive region formed therein.

* * * * *